(12) United States Patent
Flack

(10) Patent No.: US 8,203,313 B2
(45) Date of Patent: *Jun. 19, 2012

(54) SLIDING CONDUCTOR TRANSMISSION CABLE

(75) Inventor: Albert Joseph Flack, Lake Arrowhead, CA (US)

(73) Assignee: Aerovironment, Inc., Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/116,974

(22) Filed: May 26, 2011

(65) Prior Publication Data

US 2011/0221386 A1    Sep. 15, 2011

Related U.S. Application Data

(63) Continuation of application No. 12/833,838, filed on Jul. 9, 2010, now Pat. No. 7,973,516, which is a continuation of application No. PCT/US2009/030864, filed on Jan. 13, 2009.

(60) Provisional application No. 61/010,869, filed on Jan. 14, 2008.

(51) Int. Cl.
  *H02J 7/00* (2006.01)
  *B66C 13/12* (2006.01)
  *H02B 1/30* (2006.01)
  *F16L 3/00* (2006.01)

(52) U.S. Cl. ......... 320/137; 320/105; 191/12 R; 174/61; 174/63; 174/64; 174/69; 248/51; 248/52; 248/329; 248/330.1

(58) Field of Classification Search ................ 320/137
See application file for complete search history.

(56) References Cited

U.S. PATENT DOCUMENTS

| | | | | |
|---|---|---|---|---|
| 5,214,368 | A * | 5/1993 | Wells | 320/105 |
| 5,306,999 | A * | 4/1994 | Hoffman | 320/109 |
| 5,445,252 | A * | 8/1995 | McKee et al. | 191/12 R |
| 5,855,262 | A * | 1/1999 | Jackson | 191/12.4 |
| 7,256,516 | B2 | 8/2007 | Buchanan et al. | |
| 2004/0256132 | A1 * | 12/2004 | Schubert | 174/50 |

FOREIGN PATENT DOCUMENTS

| | | |
|---|---|---|
| JP | 08-033121 | 2/1996 |
| JP | 2006-334796 | 12/2006 |

OTHER PUBLICATIONS

International Search Report for Serial No. PCT/US2009/030864 dated Jul. 22, 2009.
Notice of Allowance for U.S. Appl. No. 12/833,838 mailed Mar. 18, 2011.
Non-Final Office action for U.S. Appl. No. 12/833,838 mailed Oct. 28, 2010.
Final Office action for U.S. Appl. No. 12/833,838 mailed Feb. 15, 2011.

* cited by examiner

*Primary Examiner* — Yalkew Fantu
(74) *Attorney, Agent, or Firm* — Michael Blaine Brooks, PC; Michael B. Brooks; Eric Aagaard

(57) ABSTRACT

Methods and devices for connecting a current source to a target storage device via a transmission cable extendable and/or retractable via a conduit that may be repositioned.

13 Claims, 8 Drawing Sheets

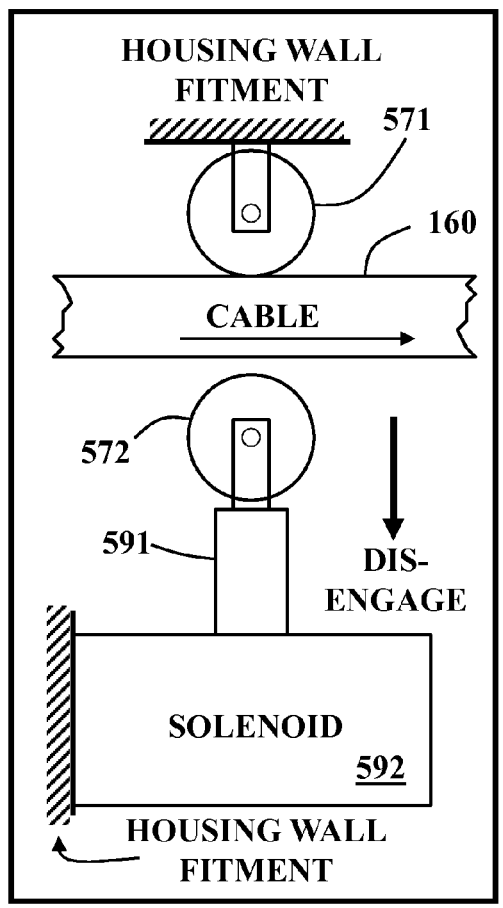
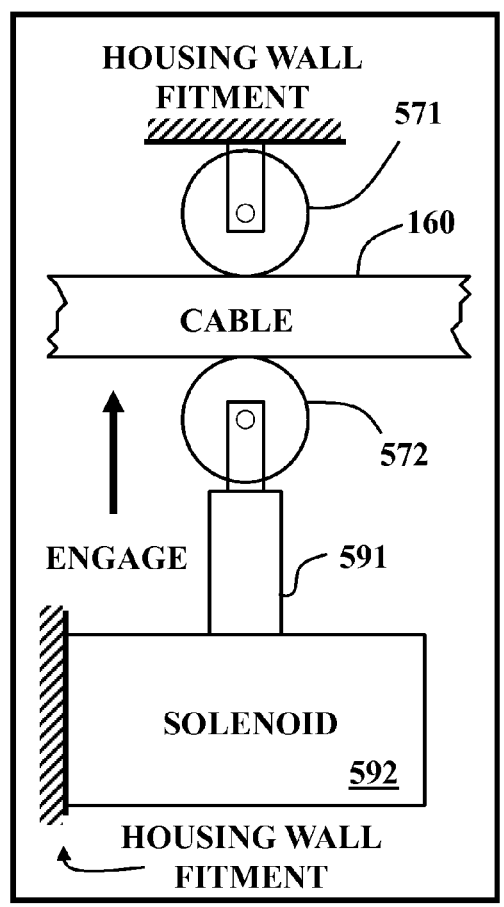
FIG. 5C    FIG. 5D

SLIDING CONDUCTOR TRANSMISSION CABLE

This application is a continuation of U.S. patent application Ser. No. 12/833,838, filed Jul. 9, 2010, now U.S. Pat. No. 7,973,516 which is a continuation of International Application No. PCT/US2009/30864 filed Jan. 13, 2009, which claims the benefit of U.S. Provisional Patent Application Ser. No. 61/010,869, filed Jan. 14, 2008, all of which are hereby incorporated herein by reference in their entirety for all purposes.

TECHNICAL FIELD

The invention, in its several embodiments, pertains generally to methods and devices for electrical transmission via a transmission cable extendable and retractable via a conduit that may be repositioned.

BACKGROUND

U.S. Pat. No. 7,256,516 and U.S. Pat. No. 5,306,999 disclose electric vehicle (EV) charging stations. EV charging stations in the state of the art typically emulate conventional gas station fueling characteristics and accordingly may be described generally as segmented into three main systems analogous to a gasoline station pump. The analogous segments include: (a) a base unit for managing the fuel supply, in this case electricity from the electric utility system; (b) a fuel transfer hose, or in the EV case a transmission cable to carry the flow of electricity to the EV; and (c) a connector from the transmission cable to the EV itself.

SUMMARY

The invention, in its several embodiments, comprises methods and devices for connecting a current source to a target storage device via a transmission cable extendable and retractable via a conduit that may be repositioned. For example, a battery charging device embodiment of the present invention may comprise: a conduit segment configured to receive an extending transmission cable; the transmission cable connectable, e.g., switchably, and/or directly, or in some fashion the transmission cable may be placed in an electrical communication with a current source; and a transmission cable drive mechanism configured to extend the transmission cable into the conduit segment. An exemplary embodiment may also include a housing that comprises the transmission cable connectable to the current source and a transmission cable drive mechanism configured to extend the transmission cable into the conduit segment. The transmission cable of some battery charging device embodiments may be disposed about at least one drive wheel aligned to extend the transmission cable in a direction away from the housing and into the conduit segment. The transmission cable drive mechanism of some battery charging device embodiments may comprise a tow wire and drive pulley. The transmission cable drive mechanism of some battery charging device embodiments may be further configured to retract the transmission cable from the conduit segment. Some battery charging device embodiments may further comprise a conduit assembly comprising the conduit segment and a handle-connector assembly comprising a transmission cable connector and a target port connector and for some of the embodiments, the transmission cable drive mechanism may comprise a partial vacuum generator effecting a partial vacuum, the partial vacuum effected proximate to the handle-connector assembly. Some battery charging device embodiments may have a transmission cable drive mechanism comprising a pressure differential generator effecting a pressure differential, the pressure differential having a volume of lower pressure effected proximate to the handle-connector assembly. Some battery charging device embodiments may air cool the transmission cable by blowing air within the conduit segment. Some battery charging device embodiments may further comprise a transmission cable comprised of at least two conductive cables, e.g., two, three or four conductive cables. Some battery charging device embodiments may further comprise a coating having a low coefficient of sliding friction interposed between the transmission cable and the conduit segment. Some battery charging device embodiments may further comprise a transmission cable drive mechanism where a first wheel opposes a second wheel and where at least one of: (a) the first wheel; and (b) the second wheel is a drive wheel, and where at least one of the first wheel and the second wheel may retractably engage the transmission cable via active mechanisms, such as via the powering of a solenoid, e.g., when extending or holding in place the transmission cable due to pulley rotation or non-rotation respectively.

Embodiments of the present invention include methods of charging a target storage device. For example, a method of charging a target storage device may comprise the steps of: (a) engaging a target storage device electrical receptacle with the target port connector of a conduit assembly comprising a conduit segment; (b) extending a transmission cable, within the conduit segment and away from a conduit assembly support structure, by a transmission cable drive mechanism, to engage the target port connector via the conduit segment; and (c) initiating current flow to the target storage device from a current source via the transmission cable. For some of the method embodiments, the transmission cable may be disposed about at least one drive wheel aligned to extend the transmission cable in a direction away from the housing and into the conduit segment. For some of the method embodiments, the transmission cable drive mechanism may comprise a tow wire and drive pulley. The exemplary methods of charging a target storage device may further comprise the steps of: (d) stopping current flow to the target storage device from the current source via the transmission cable and (e) retracting the transmission cable from the conduit segment. Some of the method embodiments may further comprise air cooling the transmission cable within the conduit segment. The exemplary methods of charging a target storage device may further comprise a coating having a low coefficient of sliding friction interposed between the transmission cable and the conduit segment.

BRIEF DESCRIPTION OF THE DRAWINGS

Embodiments of the present invention are illustrated by way of example and not limitation in the figures of the accompanying drawings, and in which:

FIGS. 5C and 5D are side views of exemplary drive wheel embodiments disengaging and engaging a transmission cable;

DETAILED DESCRIPTION

Figure 1:
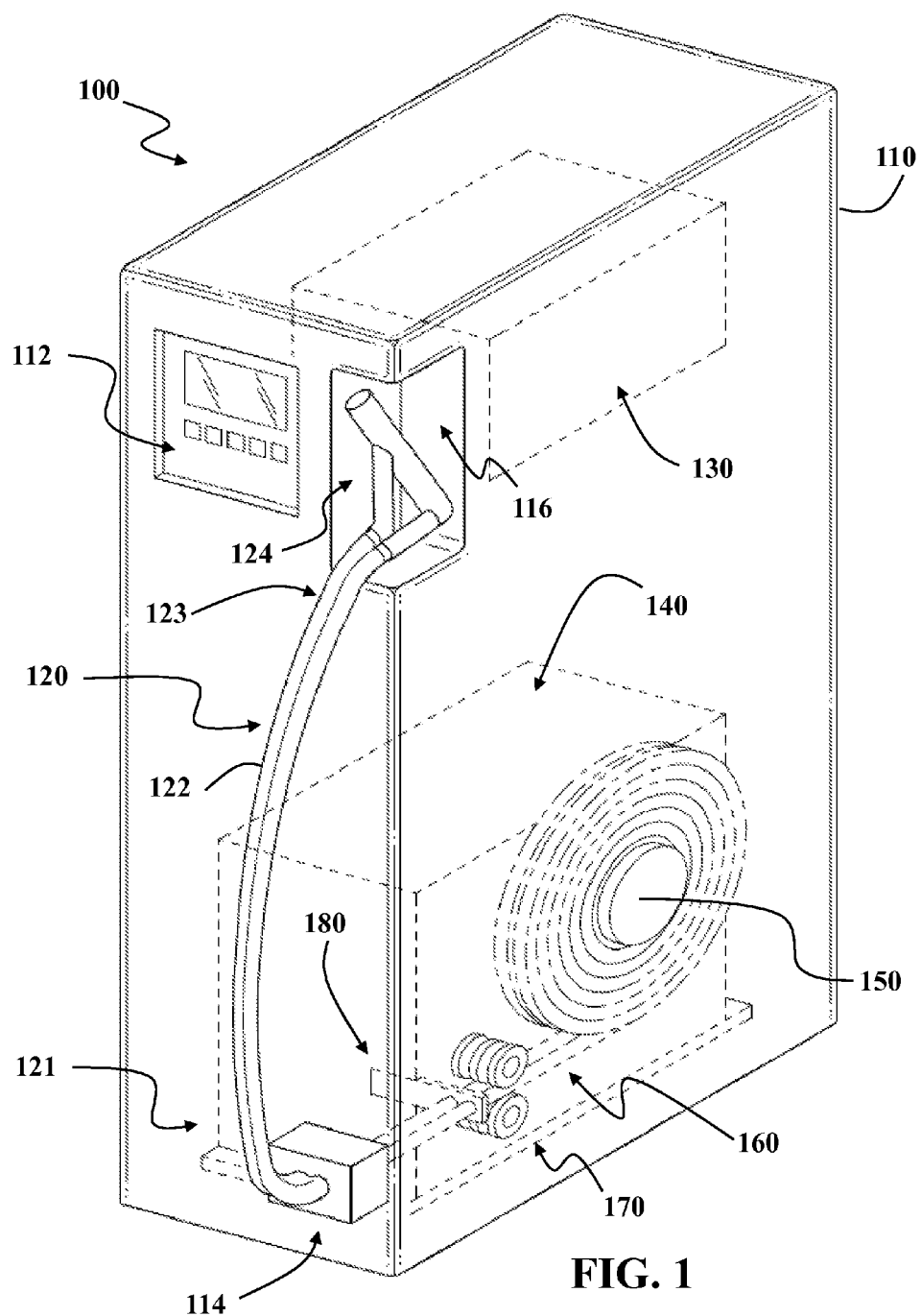
FIG. 1 is a perspective view of an embodiment of the present invention.

Reference is made to the drawings that illustrate exemplary embodiments of the present invention. FIG. 1 illustrates a charging station 100 comprising a housing 110 having a user interface 112, such as a display that may be a touch screen, and the user interface 112 may include one or more buttons. The housing 110 may further comprise as a conduit assembly support structure both an exit port 114 and docking port 116 for a charging conduit assembly 120. In some embodiments, the conduit support structure may be disposed outside of the housing 110 and include a mounting for a transmission cable 160 and/or a transmission drive mechanism. The exemplary charging conduit assembly 120 is shown comprising a conduit segment 122 having a portion proximal 121 to the housing 110, and, disposed at a distal portion 123, a handle-connector assembly 124. The handle-connector assembly 124 is configured to both receive an extended transmission cable 160 and engage a target charging port (not shown), such as an EV charging receptacle. The housing 110 is shown enclosing a processor housing 130 and a power converter housing 140 that may house a current source. The transmission cable 160 may be extended into the conduit segment 122 by a transmission cable drive mechanism. The power converter housing 140 is shown supporting a reel 150, and FIG. 1 illustrates an optional exemplary transmission cable drive mechanism as the reel 150 that may be operating as a drive wheel for extension and/or for cable retraction, about which is wound a transmission cable 160 and, in this example, the transmission cable 160 connects with the housed converter unit via an electrical interface (not shown) that may be within the reel hub. Also shown is a pair of opposing wheels, pulleys 170, or rollers, each having a pair of circumferential troughs for guiding the transmission cable 160. FIG. 1 also illustrates an optional exemplary transmission cable drive mechanism where one or both of the opposing wheels, pulleys 170, or rollers may be configured to be powered as one or more drive wheels for extending the transmission cable and/or retracting the transmission cable. A guiding element 180 having an aperture for receiving the transmission cable 160 may be mounted to the power converter housing 140. The exemplary embodiment of FIG. 1 may be applied to the charging of an electrical vehicle where the transmission cable, particularly the conduction core is sized for a current flow of greater than 400 amps.

Figure 2:
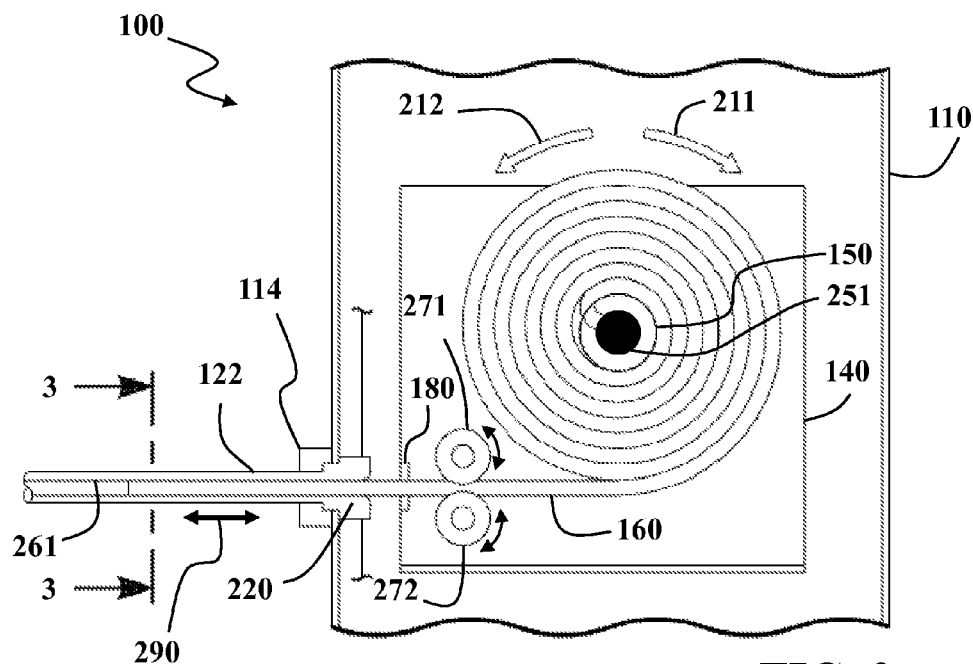
FIG. 2 is a side view of an embodiment of the present invention.

FIG. 2 illustrates a portion of the exemplary charging station 100 in a side view with a side panel of the housing 110 removed, a side panel of the exit port 114 removed, a portion of the conduit segment 122 shown in longitudinal cut-away, and the reel 150 cap is removed. In this example, at least one of: the reel 150, upper wheel or pulley 271, and/or lower wheel or pulley 272 may be powered to rotate the reel clockwise 211 and counterclockwise 212. The pair of transmission cables 160 travel 290 within the conduit segment 122 according to the direction of rotation of the at least one drive wheel. The transmission cable 160 may generally comprise an electrically insulative material, and/or a material that exhibits a low sliding friction coefficient about conductive cables, but a distal portion 261 of each of the transmission cables may be not be insulated. An inner port seal 220 is shown in cut-away having an aperture receiving the pair of transmission cables 160. The inner port seal 220 may be integral to the proximal end of the conduit segment 122. The aperture of the inner port seal 220 may be insulative material shielding the distal portion 261 of each of the transmission cables when in a state of full operational retraction. A transverse cut 3 of the conduit segment 122 containing the transmission cable 160 is shown in FIG. 3.

Figure 3:
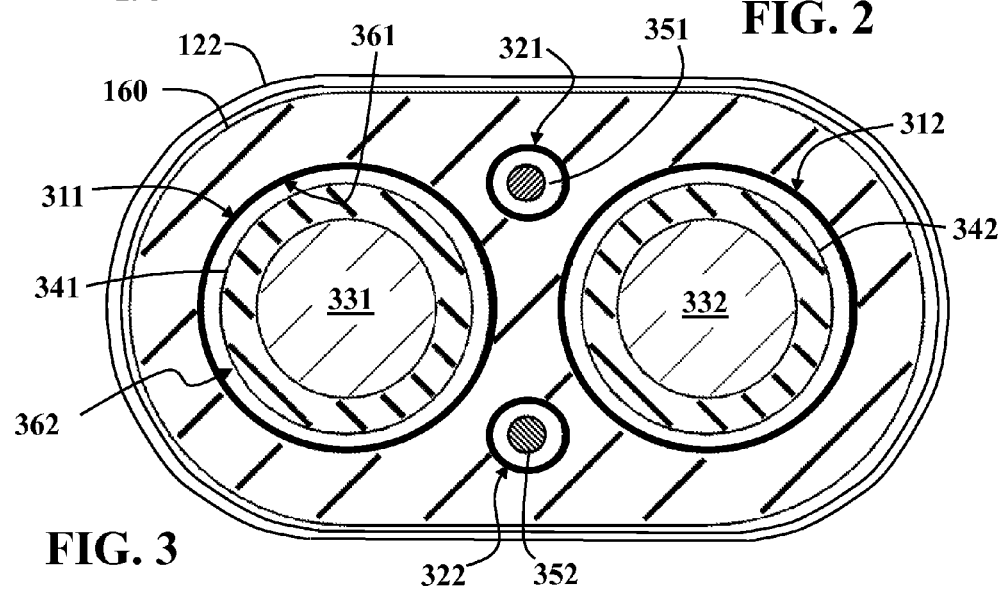
FIG. 3 is a transverse, cross-sectional view of a conduit segment of an embodiment of the present invention.

FIG. 3 illustrates an exemplary cable and conduit arrangement as a cross-sectional view of the conduit segment 122 containing a portion of the transmission cable 160 that comprises two major channels 311, 312 and two minor channels 321, 322. The inner wall of the conduit segment and the outer wall of the transmission cable may be coated or have applied to them a material exhibiting a low sliding friction coefficient. The inner walls of the two major channels 311, 312, may be coated or have applied, e.g., as a layer or a wrap, to them a material exhibiting a low sliding friction coefficient. In this example, a first conductive cable 331 and a second conductive cable 332 together comprise a conductive core of the transmission cable 160. The first conductive cable 331 may be encased in an electrically insulative material 341, and/or a material that exhibits a low sliding friction coefficient. Likewise, the second conductive cable 332 may be encased in an electrically insulative material 342, and/or a material that exhibits a low sliding friction coefficient. The outer wall of the cable encasing material 341, 342 may not fully contact each of the inner walls of the two major channels 311, 312, thereby allowing an air volume to be disposed between a portion of a major channel inner wall 361 and a portion of an encasing material outer wall 362.

During the charging process, the transmission cables may heat due to resistive effects. The conductive cables 331, 332 may be characterized for their resistivity as a function of temperature. The temperature of the conductive cables 331, 332 may be monitored by reading the voltage from one end of the cable to the other. Based on the instant current, the resistance of the cable may be derived, e.g., $R=V/I$. From the derived resistance, the temperature of the conductive cables 331, 332 may be inferred. The inferred temperature may be used in determining whether the charging is occurring within acceptably safe regions of cable temperature. To enhance the duration of a safe charging interval, active cooling of the conductive cables, the transmission cable, and/or the conduit segment may be effected by providing a conduit segment having an inner diameter larger than the outer diameter of each of the conductive cables and forcing air through the resulting volume in a direction from the charger housing to the connector end, or the reverse of that direction. The target device being charged, e.g., an electric vehicle, may have a mating receptacle, i.e., a target port, that has a mating hole that may be aligned with an exit air flow hole of the handle-connector assembly. Such an alignment may provide for the cooling of both the conductive cables 331, 332 and the target port, e.g., an EV receptacle. Accordingly, a blower (not shown) may be disposed within the housing 110, a housing 110 having an air intake duct, and the blower may be oriented to move the volume of air from the proximal portion of the conduit segment 121 toward the distal portion of the conduit segment 123 (FIG. 1). One of the exemplary minor channels 321 may house an electrical pilot wire 351 that may be used to verify a closed electrical circuit prior to powering the converter to drive current through the transmission cable 160. The other of the exemplary minor channels 322 may house a ground wire 352 and the other of the exemplary minor channels 322, or an additional minor channel, may house a communication cable (not shown) to allow for communication between a processor (not shown) enclosed by the processor housing 130 and the handle-connector assembly 124 (FIG. 1). These or additional minor channels may be used as conduits for tow cable embodiments of a transmission cable drive mechanism.

Figure 4:
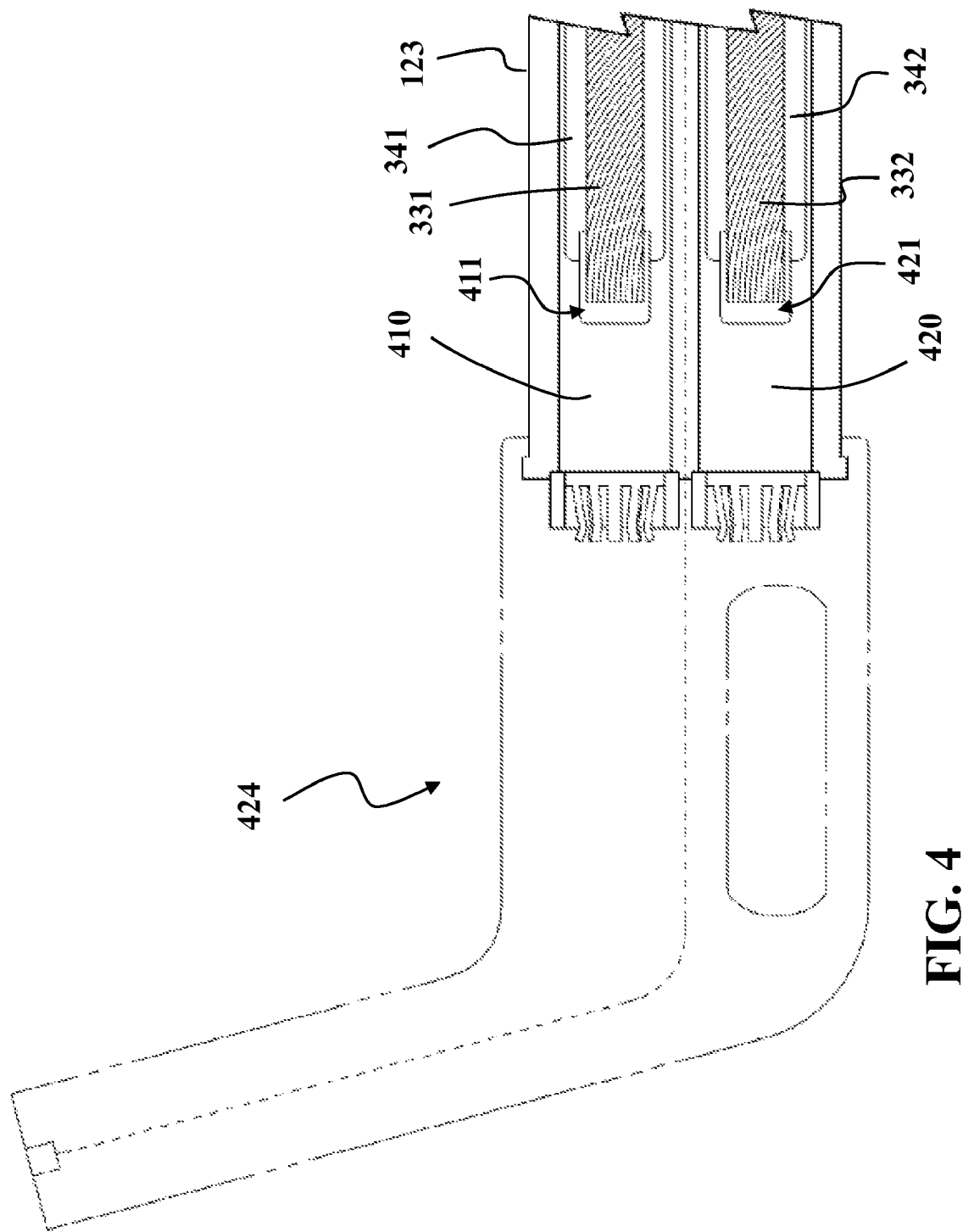
FIG. 4 is a side cross-sectional view of a handle-connector assembly embodiment of the present invention.

FIG. 4 illustrates an exemplary electrical interface at the distal end 123 of the conduit segment particularly between a handle-connector assembly 424 and the pair of conductive cables 331, 332. This example shows a first electrical connector 410 having a socket portion 411 for receiving the distal end of the first conductive cable 331 and a second electrical connector 420 having a socket portion 421 for receiving the distal end of the second conductive cable 332.

Figure 5A:
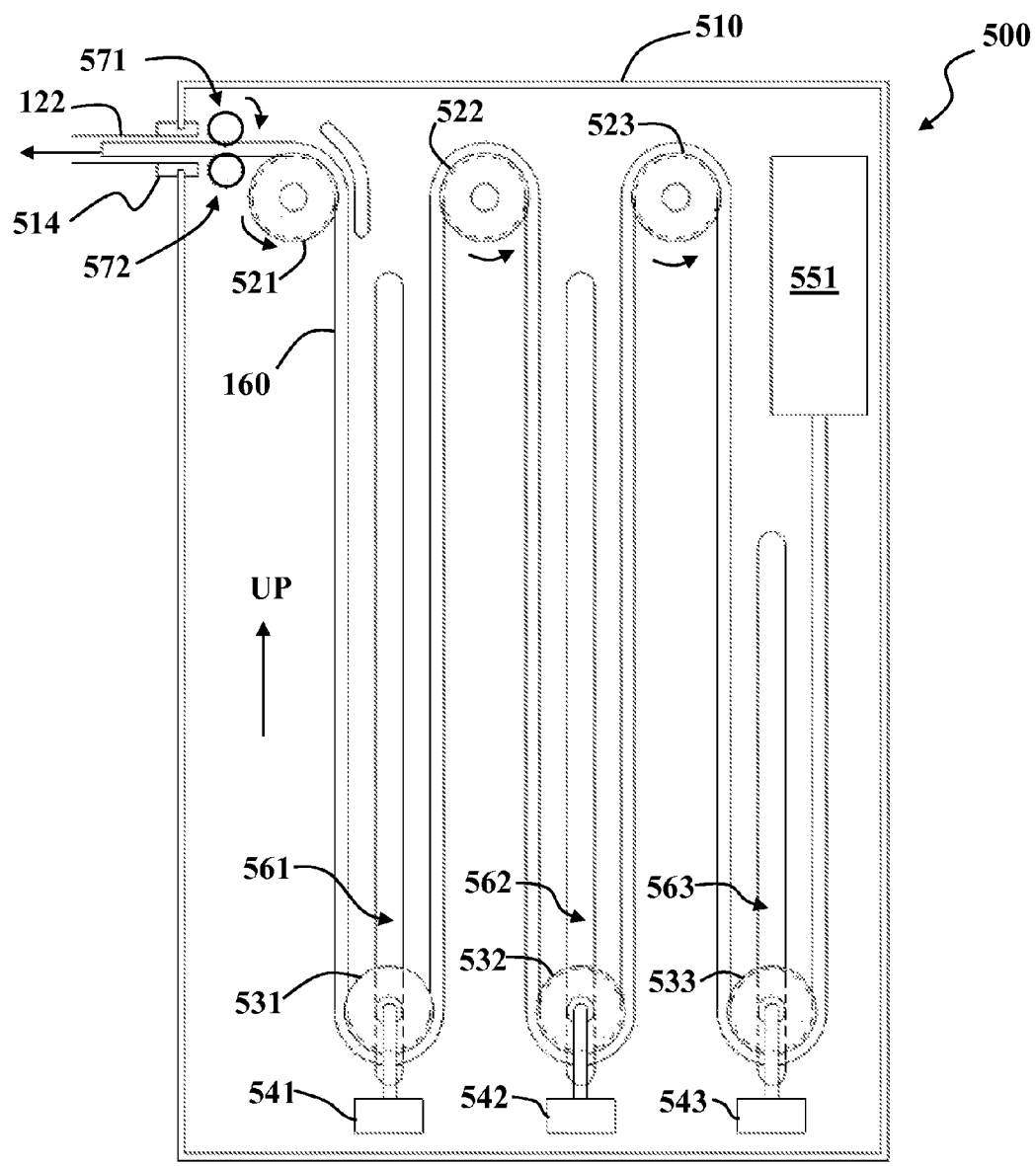
FIGS. 5A and 5B are side views of another embodiment of the present invention.
Figure 5B:
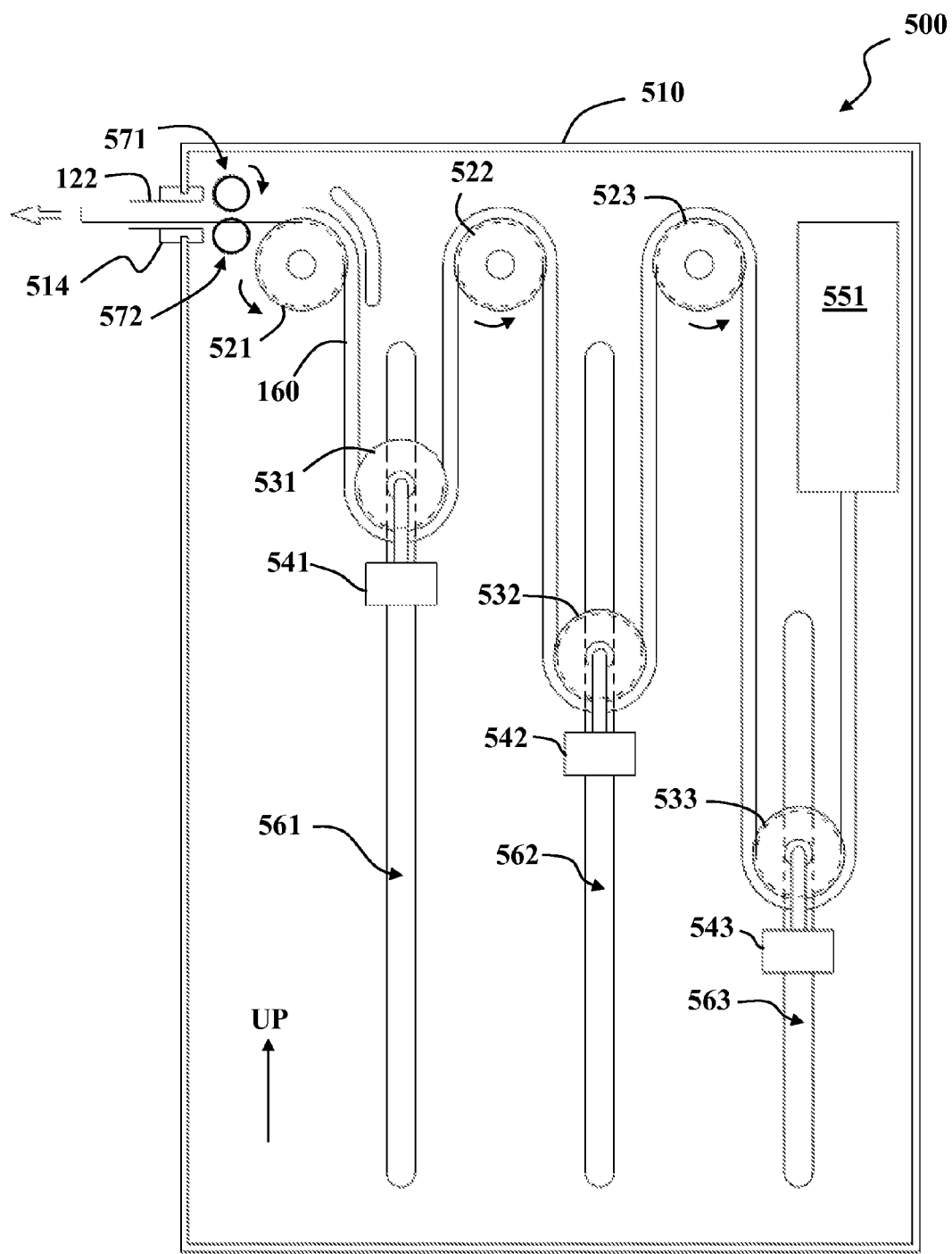

Returning to FIGS. 1 and 2, the electrical interface 251 within the reel hub may provide an electrical connection with the converter-base unit source end of the transmission cable 160 as a rotary, brush-type connection. For power and amp levels higher than those practically supported by brush-type connectors, and/or for longer wearing connections, the transmission cable 160, particularly the conductive cables 331, 332, may be solidly attached to the source end. Embodiments having fixed attachments may be configured with the transmission cable 160 disposed in a droop-loop fashion within the housing 110. One or more pulleys are powered to extend the pair of transmission cables from the housing and one or more masses or resilient elements are used to retract a previously extended transmission cable. FIG. 5A illustrates an exemplary embodiment of the invention 500 where the transmission cable 160 is looped within a housing 510 between a converter connector 551 and an exit port 514 at a proximal portion of the conduit segment 122 and by one or more powered wheels, pulleys, or rollers, operating as one or more drive wheels. In this example, in order to extend the transmission cable 160, at least a unidirectional rotational drive is applied to at least one of: (a) one or both of the minor guiding pulleys 571, 572; and (b) one or more major looping pulleys 521-523. One or more pulleys 531-533 may be deployed gravitationally below the one or more powered pulleys, e.g., one or more major looping pulleys 521-523, and aid in the retraction of the transmission cable 160. These one or more lower pulleys 531-533 may have mass augmentation 541-543, e.g., attached pendulous weights, and these one or more lower pulleys 531-533 may be disposed within guide channels 561-563. In some embodiments, at least a bidirectional rotational drive is applied to at least one of: (a) one or both of the minor guiding pulleys 571, 572; and (b) one or more major looping pulleys 521-523. FIG. 5B illustrates the exemplary embodiment of FIG. 5A in a state of transmission cable extension. The optional mass augmentation elements 541-543, e.g., pendulous weights, may be further augmented or replaced by resilient elements such as springs that under tension pull downward on the lower pulleys 531-533. Weights and or springs may be sized to overcome the sliding friction of the looping pulley system. Upon cessation of cable 160 extending mode, the rotation position of one or more powered pulleys, e.g., one or more major looping pulleys 521-523 and/or minor guiding pulleys 571, 572, may be held by one or more actuated latches, such as a solenoid-actuated clamp, that, when a charging cycle is complete or if the device losses power, the one or more solenoids retract and allow the pulleys to turn freely and thereby allow the cable to retract into the looping pulley assembly due to gravity and/or spring tension. In another example, FIG. 5C illustrates an exemplary drive mechanism comprising the minor guiding pulleys 571, 572, one of which is at least a unidirectional drive wheel, where one of the minor guiding pulleys 571, 572, in this example the lower drive pulley 572, is positioned proximate the transmission cable 160, and attached to a mounting member 591 engaging a solenoid element 592. Accordingly, the transmission cable 160 may be able to translate into the looped pulled assembly (FIG. 5B). FIG. 5D shows the lower pulley 572 engaging the transmission cable 160 due to the solenoid element 592 extending the mounting member 591. Whether an active or passive retraction mechanism is embodied, the absence of the transmission cable in the conduit segment when not in use for charging a target battery protects the transmission cable from damage and/or theft.

Figure 6:
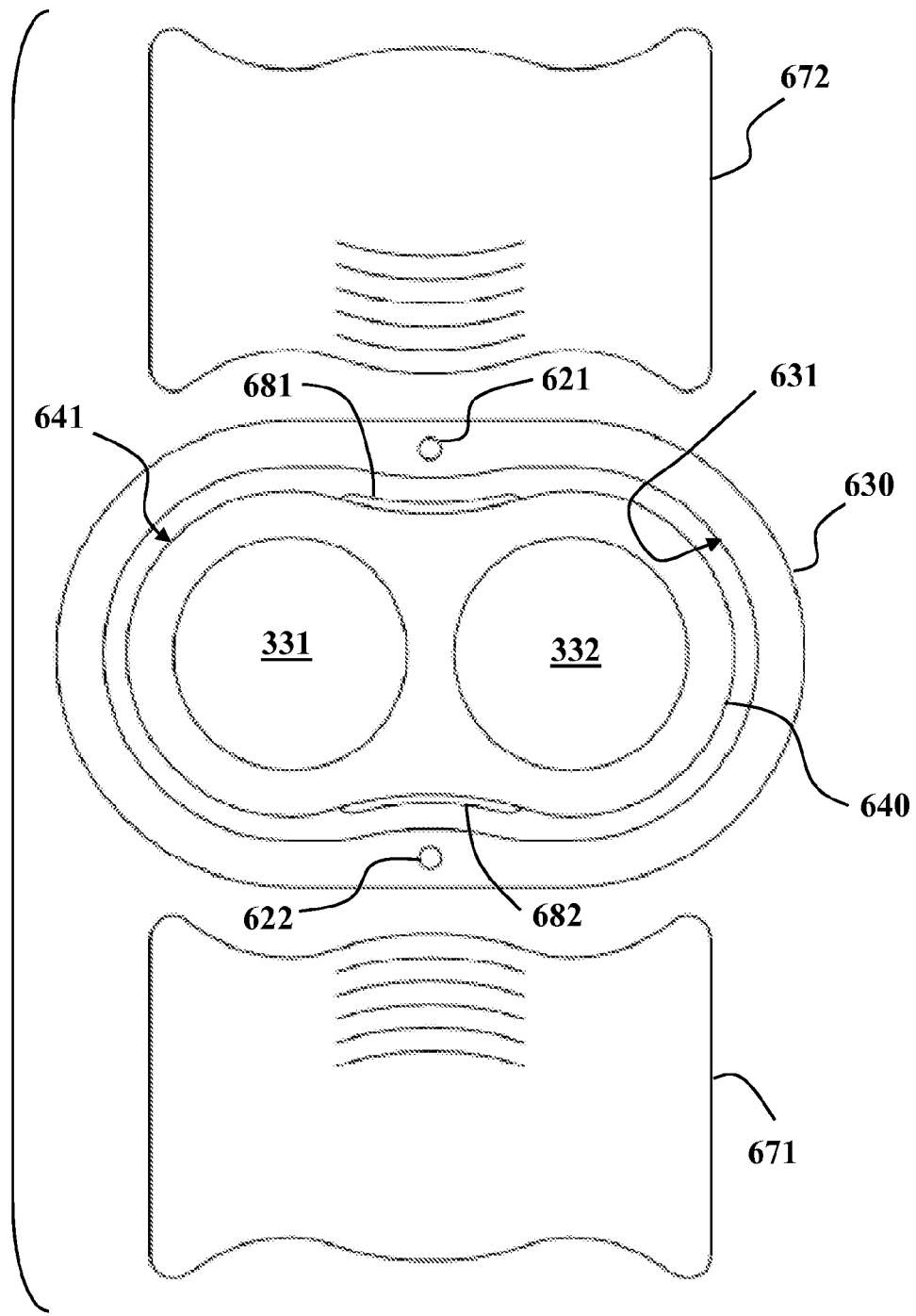
FIG. 6 is a transverse, cross-sectional view of a conduit segment of another embodiment of the present invention.

FIG. 6 shows an exploded, end-on view of another transmission cable embodiment of the invention where the pilot wire 621 and/or the ground wire 622 and/or the communication cable (not shown) are within a first conduit 630 and the pair of conductive cables 331, 332 are within a second conduit 640. The minor channels shown and/or additional minor channels may be used as conduits for tow cable embodiments of a transmission cable drive mechanism. The lower minor wheel, pulley 671, or roller and/or the upper minor wheel, pulley 672, or roller may be used to guide and/or drive the first conduit along with the second conduit into the conduit segment 122 (FIG. 1). Accordingly, additional padding material 681, 682 exhibiting a high sliding friction coefficient may be disposed, e.g., as a layer or a wrap, between the first conduit 630 and second conduit 640 proximate to the regions of the first conduit housing the pilot wire 621, and/or a ground wire 622, and/or a communication cable (not shown). The outer wall 641 of the second conduit 640 may not fully contact the inner wall 631 of the first conduit 630, thereby allowing an air volume to be disposed between a portion of the first conduit inner wall 631 and a portion of the second conduit outer wall 641. A blower (not shown) may be disposed within the housing 110 and may be oriented to move the volume of air from the proximal portion of the conduit segment 121 toward the distal portion of the conduit segment 123 (FIG. 1). In some embodiments, the conduit assembly 120 (FIG. 1) may comprise a portion of the first conduit 630 and the conduit segment 122 (FIG. 1) may comprise the first conduit 630.

Figure 7:
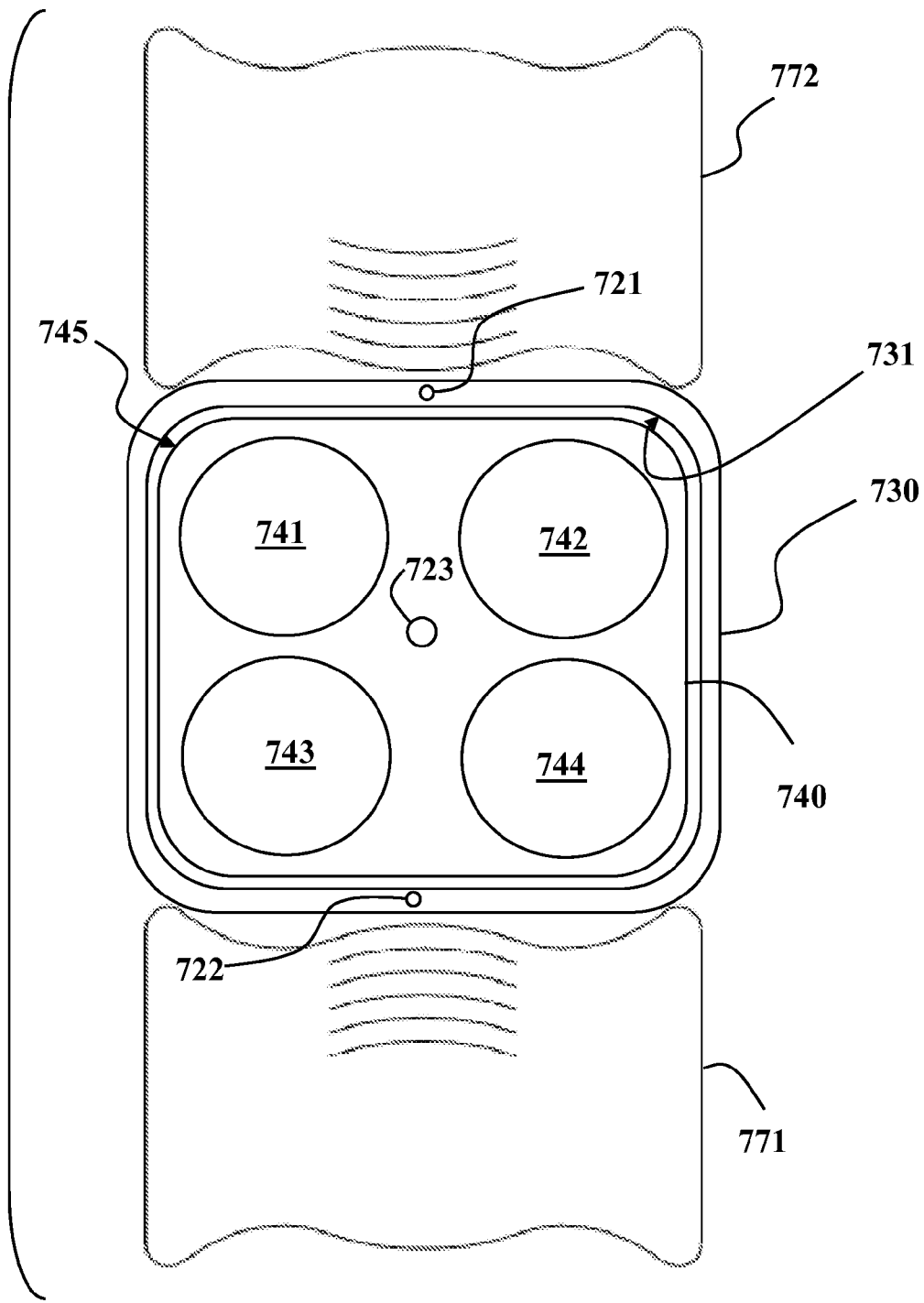
FIG. 7 is a transverse, cross-sectional view of a conduit segment of another embodiment of the present invention.

Additional channels may be present for embodiments with additional conductive cables such examples are shown in FIG. 7. FIG. 7 shows an exploded, end-on view of another transmission cable embodiment of the invention supportive of three-phase charging where a pilot wire 721, and/or a ground wire 722, are within a first conduit 730 and three or four conductive cables 741-744, and an optional communication cable (723), are within a second conduit 740. The minor channels shown and/or additional minor channels may be used as conduits for tow cable embodiments of a transmission cable drive mechanism. The lower minor wheel, pulley 771, or roller and/or the upper minor wheel, pulley 772, or roller may be used to guide and/or drive the first conduit along with the second conduit into the conduit segment 122 (FIG. 1). Material exhibiting a high sliding friction coefficient may be disposed e.g., as a layer or a wrap, between the first conduit 730 and second conduit 740 The outer wall 745 of the second conduit 740 may not fully contact the inner wall 731 of the first conduit 730, thereby allowing an air volume to be disposed between a portion of the first conduit inner wall 731 and a portion of the second conduit outer wall 745. A blower (not shown) may be disposed within the housing 110 and may be oriented to move the volume of air from the proximal portion of the conduit segment 121 toward the distal portion of the conduit segment 123 (FIG. 1). In some embodiments, the conduit assembly 120 (FIG. 1) may comprise a portion of the first conduit 730 and the conduit segment 122 (FIG. 1) may comprise the first conduit 730.

Referring again to FIG. 1, an exemplary method of use, for example, as an EV charging station, has a user handling the conduit segment 122 via the handle-connector assembly 124 where the transmission cable 160 has not yet been extended into the conduit segment 122. The charging conduit assembly 120 does not have the mass of the transmission cable 160 in this state. Accordingly, the user may be handling a charging conduit assembly that may be manufactured to be of a similar size, weight, and maneuverability to a conventional gasoline station fuel hose or, in some embodiments at least an assembly that is of less mass and greater maneuverability than that of a transmission cable, or cables, included therein.

To initiate the extension of the transmission cables, the user may input a signal via a user interface 112, such as a button, at the handle-connector assembly 124, that may be communicated to a processor via a communication cable, and/or the user may input a signal via a user interface 112 at the housing 110. Responsive to the user input, the transmission cables are extended from the housing 110 and within the conduit segment 122 until connected with the handle-connector assembly 124. Once a safe connection has been verified, e.g., via an electrical controller unit within the handle, flow of current via the transmission cables may begin.

Referring again to FIGS. 1, 4, and 5A-5B, the retraction of the transmission cable 160 may be automated in that once a full charge level and/or time of charging is achieved, a signal may be sent to the converter unit that signals the stoppage of the current flow, and that signal, or a signal based one or more similar parameters, may initiate the detachment of the transmission cable 160, i.e., the conducting core, e.g., conductive cable 331, 332, from the connector. The transmission cable may then be retracted through the conduit segment and into the housing. Once the transmission cable 160 is retracted fully, or at least retracted sufficiently to a point of protecting the ends of the conductive core, e.g., the distal ends of the conductive cables 331, 331, the user may be signaled, e.g., by lights, a user interface panel, and/or an audible bell and/or an automated voice, e.g., "return the handle to its cradle," to return the conduit assembly, to its resting position at or about the housing of the charging device. In some embodiments, the handle 424 may be attached or affixed to the vehicle in such a fashion that the handle 424 cannot be removed by the user until a disengaging signal is sent to the handle indicating that the transmission cable 160 has retracted sufficiently from the conduit segment 122.

The invention in its several embodiments may not be limited to a transmission cable for EV charging stations, and may include other embodiments and applications where reduction of transmission cable weight is desirable for its handling and the absence of the transmission cables in a conduit prior to charging may be preferred on a basis of improved human safety. Embodiments of the present invention may be enhanced with the inclusion of one or more safety switches and electrical control circuitry that may be included so the user is assured of these measures.

Embodiments may be configured with various cable drive mechanisms and other ways of extending and retracting the transmission cable. For example, in addition to a pair of opposed dual wheels, pulleys, or rollers, 271, 272, 571, 572 (FIGS. 1 and 5A) that may have troughs for a snug cable fitting, the transmission cables may be pulled through the conduit segment 122 by a small diameter, nonconductive, tow cable where the tow cable may be driven by one or more powered wheels, pulleys, or rollers. A cable collar, preferably nonconductive, may be connected to either a reciprocating tow cable, i.e., configured in tandem with the extending tow cable, or a second tow cable, independent of the extending tow cable, may be used to retract the transmission cable. For some smaller diameter transmission cable 160, the transmission cable 160 may be drawn into a partial vacuum, or otherwise respond to a pressure differential created on the handle-connector portion 124 of the conduit 120 by a vacuum device that may be located within the housing 110 and a vacuum tube (not shown) integral to the conduit segment 122 and/or via a blower (not shown) located within the housing 110 impinging on an air-blocking collar disposed about a distal portion of the transmission cable 160.

The core of the transmission cable may be made of copper wire strands braided and/or twisted together. The conduit and the transmission cable covering may be made of weather resistant synthetic rubbers, such as neoprene. Plastics, including thermosetting plastics, may be used in insulative conduit connections. Polytetrafluoroethenes, such as TELFON™ by DuPont De Nemours and Company Corporation, may be used for surfaces having low sliding friction coefficients.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A battery charging cable assembly comprising:
   a conduit segment configured to slidably conduct a transmission cable in retraction, wherein the transmission cable is connectable to a current source; and
   a transmission cable drive mechanism configured to retract a portion of the transmission cable out from the conduit segment.

2. The battery charging cable assembly of claim 1 wherein a distal portion of the transmission cable is configured to detach from a socket portion of a handle connector assembly.

3. The battery charging cable assembly of claim 1 wherein a coating having a low coefficient of sliding friction is interposed between the transmission cable and the conduit segment.

4. The battery charging cable assembly of claim 1 wherein the transmission cable drive mechanism further comprises one or more pulleys having a suspended mass, wherein the one or more pulleys having a suspended mass are configured to retract the transmission cable upon release of the one or more suspended masses.

5. A battery charging device comprising:
   a conduit segment configured to expel a transmission cable;
   wherein the conduit segment is further configured to slidably conduct the transmission cable;
   wherein the transmission cable is connectable to a current source; and
   wherein the transmission cable is configured to recede from the conduit segment.

6. The battery charging device of claim 5 wherein the transmission cable is air-cooled within a volume between the transmission cable and the conduit segment.

7. The battery charging device of claim 5 wherein a coating having a low coefficient of sliding friction is interposed between the transmission cable and the conduit segment.

8. A method of stopping the charging of a target storage device having a connector, the method comprising:

ceasing a current flow to the target storage device from a current source via a transmission cable within a conduit segment;

retracting, by a transmission cable drive mechanism, the transmission cable within the conduit segment, toward a conduit assembly support structure to disengage the target storage device connector; and disengaging the target storage device connector from a connector of a conduit assembly, wherein the conduit assembly comprises the conduit segment, and wherein the conduit segment is configured to slidably conduct the transmission cable.

9. The method of stopping the charging of a target storage device of claim 8 wherein the transmission cable is disposed about at least one drive wheel aligned to retract the transmission cable in a direction toward the conduit assembly support structure and via the conduit segment.

10. The method of stopping the charging of a target storage device of claim 8 wherein the transmission cable drive mechanism comprises a one or more suspended pulleys conducting the transmission cable.

11. The method of stopping the charging of a target storage device of claim 8 further comprising air cooling the transmission cable within the conduit segment.

12. The method of stopping the charging of a target storage device of claim 8 wherein a housing comprises the conduit assembly support structure.

13. The method of stopping the charging of a target storage device of claim 8 wherein a coating having a low coefficient of sliding friction is interposed between the transmission cable and the conduit segment.

* * * * *